US006738870B2

(12) United States Patent
Van Huben et al.

(10) Patent No.: US 6,738,870 B2
(45) Date of Patent: May 18, 2004

(54) HIGH SPEED REMOTE STORAGE CONTROLLER

(75) Inventors: Gary A. Van Huben, Poughkeepsie, NY (US); Michael A. Blake, Wappingers Falls, NY (US); Pak-Kin Mak, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 09/745,593

(22) Filed: Dec. 22, 2000

(65) Prior Publication Data

US 2002/0083299 A1 Jun. 27, 2002

(51) Int. Cl.$^7$ ................................................ G06F 12/00
(52) U.S. Cl. ...................... 711/150; 711/124; 711/130; 711/147; 711/148
(58) Field of Search ................................. 711/124, 130, 711/148, 147, 150; 709/214

(56) References Cited

U.S. PATENT DOCUMENTS 6,108,753 A * 8/2000 Bossen et al. ............... 711/118
6,175,905 B1 * 1/2001 Manning ..................... 711/169

FOREIGN PATENT DOCUMENTS

EP          945798 A2 * 9/1999   ............. G06F/9/46

OTHER PUBLICATIONS

Store Pad (Clear Line) Service Mechanism, IBM Technical Disclosure Bulletin, Apr. 1983, vol. 25, No. 11A, pp. 5893–5841.*

Multiprocessing System Memory Access Queue and Scheduling Apparatus, IBM Technical Disclosure Bulletin, May 1992, vol. 34, No. 12, pp. 299–300.*

Jim Handy, The Cache Memory Book, 1998, Academic Press, pp. 72–75.*

IBM PPC403GCX Embedded Controllers User's Manual, May 1998, IBM Coporation, pp. 4–1 to 4–3.*

* cited by examiner

Primary Examiner—Mano Padmanabhan
Assistant Examiner—John M Ross
(74) Attorney, Agent, or Firm—Lynn L. Augspurger

(57) ABSTRACT

A high speed remote storage controller system for a computer system has cluster nodes of symmetric multiprocessors. A plurality of clusters of symmetric multiprocessors each of has a plurality of processors, a shared cache memory, a plurality of I/O adapters and a main memory accessible from the cluster. Each cluster has an interface for passing data between cluster nodes of the symmetric multiprocessor system. Each cluster has a local interface and interface controller. The system provides one or more remote storage controllers each having a local interface controller and a local-to-remote data bus. A remote resource manager manages the interface between clusters of symmetric multiprocessors. The remote store controller is responsible for processing data accesses across a plurality of clusters and processes data storage operations involving shared memory. A macro is provided for processing a plurality of simultaneous data storage operations either synchronously through interaction with a sequential multistage centralized pipeline to serialize requests and provide address interlocking services or asynchronously whereby main memory accesses bypass a centralized system pipeline. These accesses can occur in parallel with other remote storage operations.

4 Claims, 10 Drawing Sheets

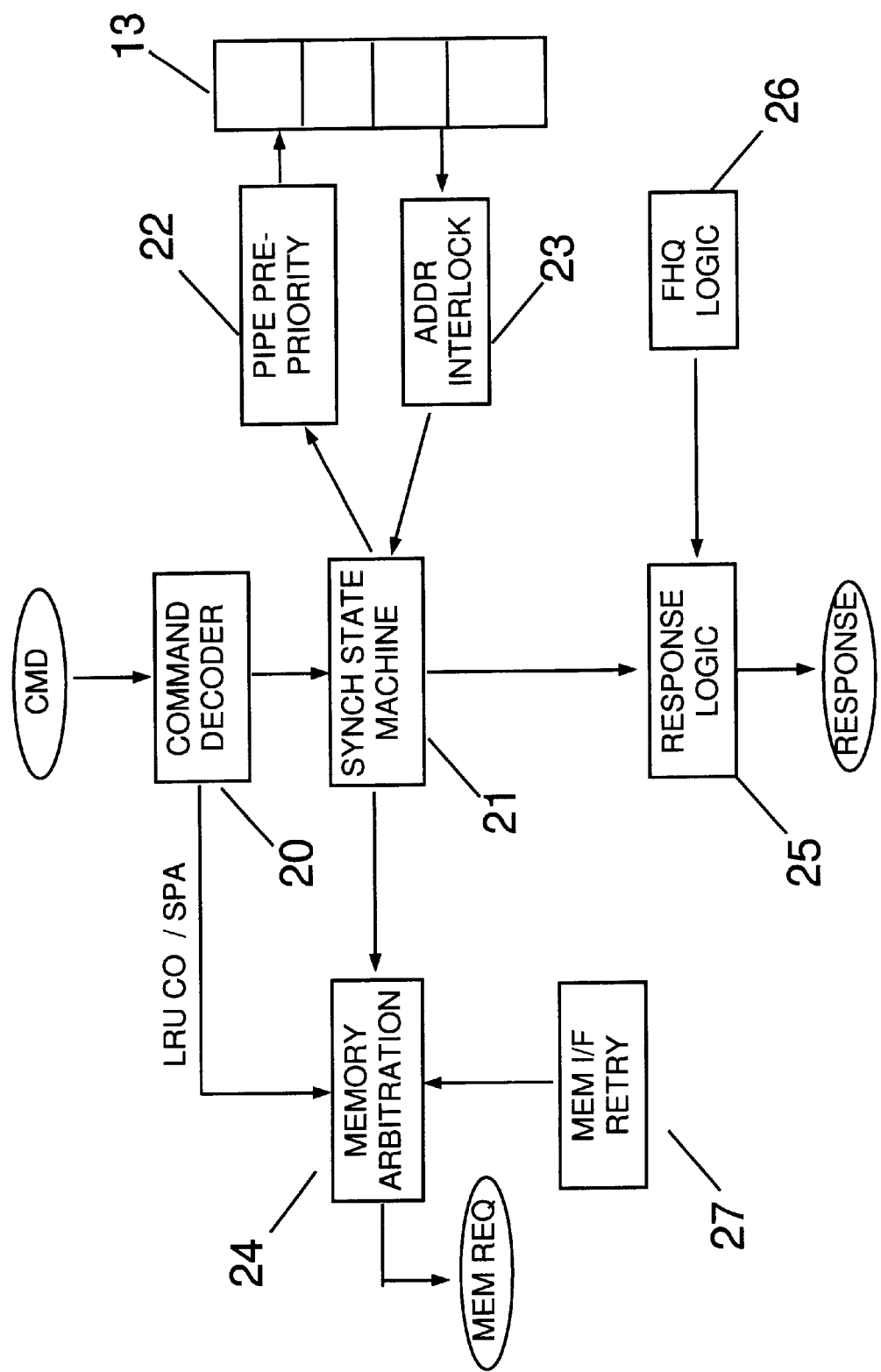

FIGURE 2B

| COMMAND | LOCAL CACHE STATE | REMOTE CACHE STATE | STATE MACHINE SEQUENCE |
|---|---|---|---|
| MOVE PG STORE / STORE PAD | MISS | MISS | 0 |
| MOVE PG STORE / STORE PAD | MISS | EXIO, READ-ONLY, MULTI-COPY | 0 —> A |
| MOVE PG STORE / STORE PAD | MISS | EXCP | 0 —> 2 —> A |
| MOVE PG STORE / STORE PAD | READ-ONLY & MULTI-COPY | READ-ONLY & MULTI-COPY | 0 —> A |
| I/O STORE | MISS | MISS | 0 |
| I/O STORE | MISS | EXIO, READ-ONLY, MULTI-COPY | 0 —> E |
| I/O STORE | MISS | EXCP | 0 —> 2 —> E |
| SPA / LRU | ANY | ANY | 0 |

| RSAR OPERATION | OPERATION LSAR IS PROCESSING | | | |
|---|---|---|---|---|
| | LRU CAST OUT | STORE PAD | I/O STORE | MOVE PAGE STORE |
| LRU CAST OUT | IGNORE | IGNORE | IGNORE | IGNORE |
| STORE PHYSICAL ABSOLUTE | IGNORE | IGNORE | IGNORE | IGNORE |
| STORE PAD | WAIT | ABORT | IGNORE | ABORT |
| EXCLUSIVE INVALIDATE | WAIT | ABORT | IGNORE | ABORT |
| I/O STORE (including query) | WAIT | ABORT | IGNORE | ABORT |
| MOVE PAGE STORE | WAIT | ABORT | IGNORE | ABORT |

35

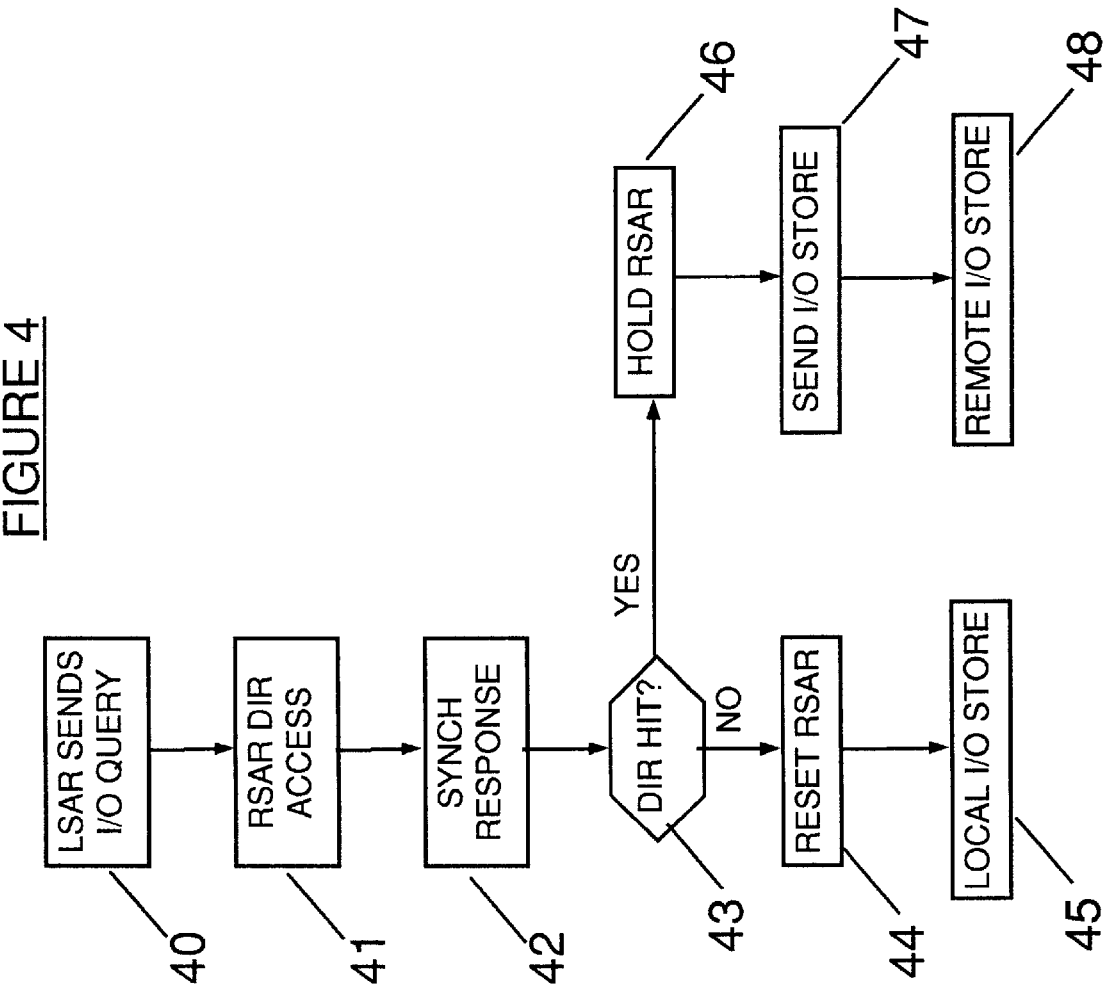

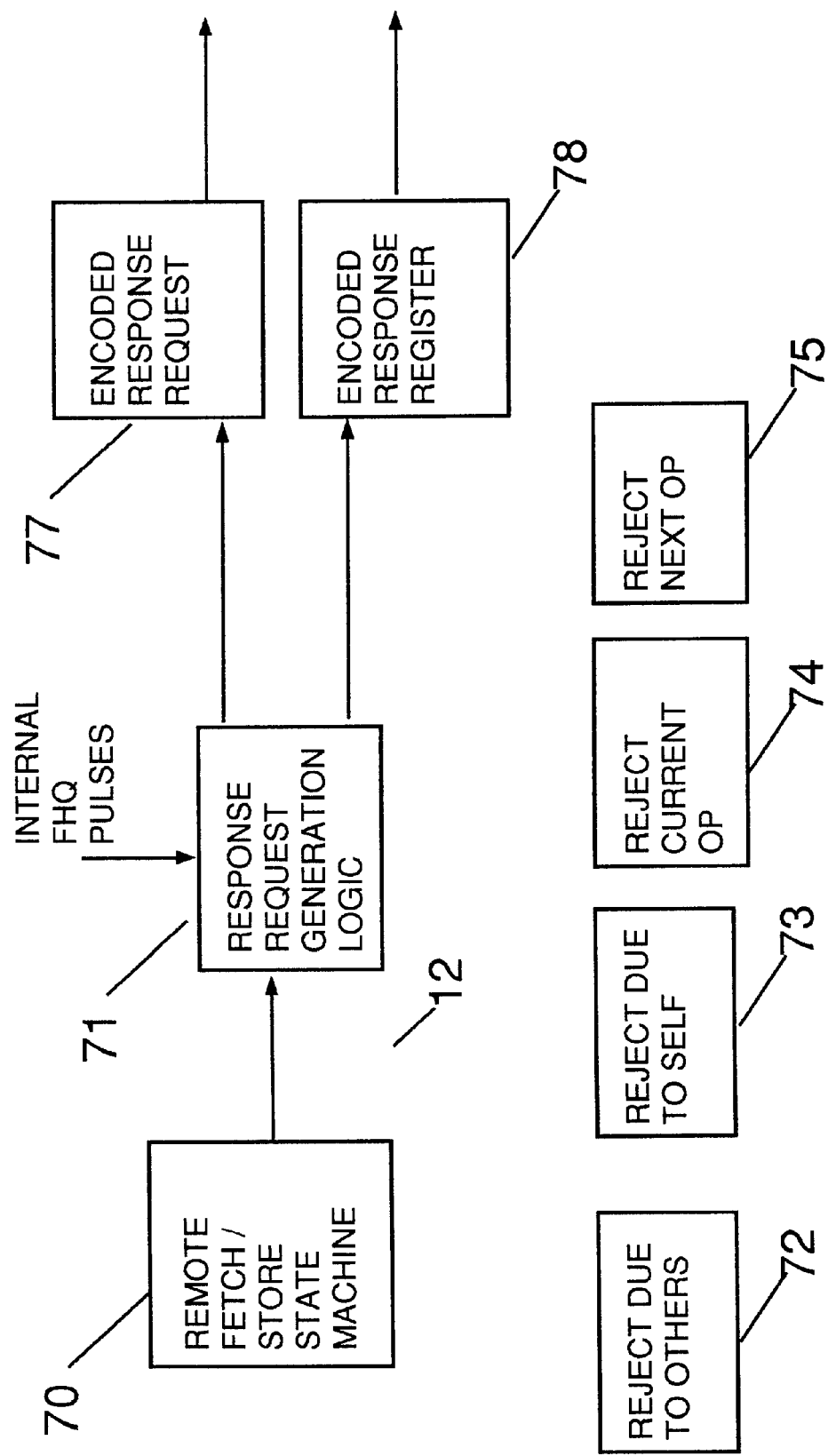

HIGH SPEED REMOTE STORAGE CONTROLLER

RELATED APPLICATIONS

This application entitled "High Speed Remote Storage Controller" is related to U.S. Ser. No. 09/745,830, filed Dec. 22, 2003 and entitled "Method for deadlock avoidance in a cluster environment"; and also to U.S. Ser. No. 09/747,686, filed Dec. 22, 2003, and entitled "Clustered Computer System with Deadlock Avoidance".

These co-pending applications and the present application are owned by one and the same assignee, International Business Machines Corporation of Armonk, N.Y.

The descriptions set forth in these co-pending applications are hereby incorporated into the present application by this reference.

Trademarks: S/390 and IBM are registered trademarks of International Business Machines Corporation, Armonk, N.Y., U.S.A. Other names such as z900 may be registered trademarks or product names of International Business Machines Corporation or other companies.

FIELD OF THE INVENTION

This invention is related to computer systems and particularly to a high speed remote storage controller.

BACKGROUND OF THE INVENTION

Today's e-business environment places great demands on the computer systems that drive their infrastructure. This is especially true in the areas of system performance and availability due in large part to the increasing amount of data sharing and transaction processing inherent in large system applications. Another aspect of the e-business infrastructure is the unpredictability of the workloads which mandate the underlying computer systems to be highly scalable. However, the importance of additional performance and salability must always be tempered by the cost of the systems.

Historically system architects have used various means to achieve high performance in large tightly coupled symmetrical multiprocessor (SMP) computer systems. They range from coupling individual processors or processor clusters via a single shared system bus, to coupling processors together in a cluster, whereby the clusters communicate using a cluster-to-cluster interface, to a centrally interconnected network where parallel systems built around a large number (i.e. 32 to 1024) of processors are interconnected via a central switch (i.e. a crossbar switch).

The shared bus method usually provides the most cost efficient system design since a single bus protocol can service multiple types of resources. Furthermore, additional processors, clusters or peripheral devices can be attached economically to the bus to grow the system. However, in large systems the congestion on the system bus coupled with the arbitration overhead tends to degrade overall system performance and yield low SMP efficiency. These problems can be formidable for symmetric multiprocessor systems employing numerous processors, especially if they are running at frequencies that are two to four times faster than the supporting memory subsystem.

The centrally interconnected system usually offers the advantage of equal latency to shared resources for all processors in the system. In an ideal system, equal latency allows multiple applications, or parallel threads within an application, to be distributed among the available processors without any foreknowledge of the system structure or memory hierarchy. These types of systems are generally implemented using one or more large crossbar switches to route data between the processors and memory. The underlying design often translates into large pin packaging requirements and the need for expensive component packaging. In addition, it can be difficult to implement an effective shared cache structure.

The tightly coupled clustering method serves as the compromise solution. In this application, the term cluster refers to a collection of processors sharing a single main memory, and whereby any processor in the system can access any portion of the main memory, regardless of its affinity to a particular cluster. Unlike Non-Uniform Memory Access (NUMA) architectures, the clusters referred to in our examples utilize dedicated hardware to maintain data coherency between the memory and the hierarchical caches located within each cluster, thus presenting a unified single image to the software, void of any memory hierarchy or physical partitions such as memory bank interleaves. One advantage of these systems is that the tightly coupled nature of the processors within a cluster provides excellent performance when the data remains in close proximity to the processors that need it such as the case when data resides in a cluster's shared cache or the memory bank interleaves attached to that cluster. In addition, it usually leads to more cost-efficient packaging when compared to the large N-way crossbar switches found in the central interconnection systems. However, the clustering method can lead to poor performance if processors frequently require data from other clusters, and the ensuing latency is significant, or the bandwidth is inadequate.

One of the ways to combat the performance problem is the use of large shared caches within each cluster. Shared caches are inherently more efficient in large data sharing applications such as those typical of the e-business environment. But even in the most efficient system, the need eventually arises to transfer data across clusters. Therefore, system performance in these types of computer structures can be influenced by the latency involved with cross cluster data transfers. Historically, system performance issues tended to focus on processor fetch operations and minimizing the associated latency of data fetches from the hierarchical caches and main memory.

However, in complex systems like the IBM e-server Z-Series, the fetch is typically just one piece contributing to the system performance. For example, a fetch may necessitate casting aged data out of a clustered cache to make room for the desired fetch data. In addition, one processor's fetch may be competing for the inter nodal data busses with work from the other processors and/or I/O adapters. These operations involve not only fetches for other processors, but cast outs of aged data from a cache on one cluster to main memory on the remote cluster or fetches and stores from the I/O adapters. The need to accommodate all these types of inter nodal operations demands a multitude of large data busses between the clusters. Unfortunately packaging restrictions typically limit the amount of available bandwidth on the inter nodal data bus. Therefore, to truly maximize overall system throughput, performance improvements must be made to all types of inter nodal data transfers, not just processor fetches.

With the disparate rate of advance between processor next generation processors and memory, components such as the system memory controller become increasingly more valuable to overall system throughput. The inventions cited herein provide many improvements in the area of memory and the corresponding controllers, however they fail, both independently and in conjunction with each other, to address all aspects found in the present invention.

U.S. Pat. No. 5,664,162, entitled Graphics Accelerator with Dual Memory Controller, focuses on performing memory accesses with respect to a graphics processor. This invention teaches improvements pertaining to address format translations, frame buffer remapping, object drawing and other tasks related to rendering graphical images using a computer system. U.S. Pat. No. 5,239,639, entitled Efficient Memory Controller with an Independent Clock, provides a means to synchronize the timing of a memory controller with a CPU, without requiring the memory controller and CPU to share the same operating frequency. U.S. Pat. No. 5,896,492, entitled Maintaining Data Coherency Between a Primary Memory Controller and a Backup Memory Controller, describes a fault tolerant memory controller to ensure data availability in the event of a memory controller failure.

U.S. Pat. No. 5,835,947, entitled Central Processing Unit and Method for Improving Instruction Cache Miss Latencies Using an Instruction Buffer Which Conditionally Stores Additional Addresses, U.S. Pat. No. 3,611,315, entitled Memory Controller System for Controlling a Buffer Memory, and U.S. Pat. No. 5,778,422, entitled Data Processing System Memory Controller that Selectively Caches Data Associated with Write Requests, all concentrate on pre fetching instructions or caching data accesses into memory buffers to reduce latency on subsequent CPU fetches. Although the aforementioned inventions teach various improvements in memory controllers, they all fail to address performance issues associated with accessing a shared memory in a symmetric multiprocessing (SMP) computer system.

U.S. Pat. No. 5,752,066, entitled Data Processing System Utilizing Programmable Microprogram Memory Controller, describes a single system-level interface to be presented to the operating system and application programs by allowing a plurality of memory configurations to be reprogrammed via micro code. Unlike our invention, this one provides a means to enhance or alter the functionality of the memory controller without the need to change the hardware, whereas our invention focuses mainly on solving performance issues associated with concurrent memory accesses in an SMP computer system. One skilled in the art would appreciate how the two inventions address unrelated topics, yet could be combined with each other to offer additional improvements upon each invention.

Finally, U.S. Pat. No. 5,815,167, entitled Method and Apparatus for Providing Concurrent Access by a Plurality of Agents to a Shared Memory, focuses on providing simultaneous access to a shared main memory by a memory controller and a graphics controller. Said invention achieves this by providing a dual data path and partitioning the memory into a section for system access and a frame buffer for use by the graphics controller. This invention, as well as all those cited in the prior art, fail to provide a means of improving general data accesses to a unified main memory equally accessible by a plurality of central and I/O processing units in a symmetric multiprocessing computer system. Furthermore, they fail to address aspects related to maintaining proper shared cache coherency in such an environment.

SUMMARY OF THE INVENTION

The present Remote Storage Controller performs various storage operations and associated cache management functions on behalf of a requesting controller located on a remote cluster. The techniques described herein enable a multitude of operations to occur in a concurrent and high speed manner using a minimal of external control signals.

The present invention describes a unified Remote Storage Controller (known hereto forth as RSAR) which handles all types of inter nodal storage operations. This controller employs an optimized cache coherency scheme and the principles described in U.S. Pat. No. 6,038,651 entitled SMP Clusters with Remote Resource Management for Distributing Work to Other Clusters while Reducing Bus Traffic to a Minimum. The Remote Storage Controller system enlists a single controller to perform remote cast outs, store requests from an I/O adapter, main storage padding operations, and main memory move page operations. Although the primary role of RSAR is to perform remote data storage operations to main memory, it also handles cross cluster invalidations associated with maintaining BI-nodal cache coherency.

The preferred embodiment is incorporated into an Symmetric Multiprocessing System comprising a plurality of Central Processors, each having a private L1 cache, a plurality of I/O Adapters, and a main memory wherein any Processor or I/O Adapter can access any portion of the memory. The total number of Processors and I/O Adapters are divided equally into two clusters. In addition, the main memory is comprised of banks or interleaves, half of which are attached to each cluster.

Within each cluster there exists a System Controller which consists of a system coherency management unit, shared cluster cache, various controllers, multiport data switch, and discrete interfaces (or ports) to every Processor, I/O Adapter, and the main memory. The cache represented in the present embodiment is comprised of a plurality of banks or interleaves and the contents are managed by a 16-way associative directory. The System Controller depicted in FIG. 1 illustrates the major functional elements and will be described further in the detailed description of the preferred embodiment. However, a brief overview of the System Controller within a single cluster is beneficial in understanding the aspects of the present invention.

The primary function of the System Controller is to process data fetch and store requests coherently between the Processors and I/O Adapters and the system's main memory. Since the System Controller contains a shared cache, which is architecturally invisible to the software and operating system, the System Controller is also responsible for performing directory and cache accesses. All incoming requests enter a port on the System Controller, where they are received by a Central Processor (CFAR) or I/O Controller. These controllers generate requests into a Central Priority unit which arbitrates among them and chooses one of the requesters to enter into one of two multistage Pipelines based on the address. During each stage of the pipeline the requester accesses and/or reserves various resources such as the cache, the Local Cache Fetch/Store Controllers, the data path controls, data path fifo buffers, the Remote Cache Fetch/Store Controllers, etc.

As requests exit the pipeline, one of the Local Fetch/Store Controllers assumes responsibility for managing the operation through completion. Often this requires additional passes through the pipeline, therefore a Local Fetch/Store Controller must also participate in Central Priority arbitration, and is also considered a requester. In the present embodiment, we include the Cache Controller and the Main Memory Controller, as part of the Local Fetch/Store Controllers, Between them they contain all the resources (including data path elements such as fifo buffers and cross point switches) necessary to access data from the cache interleaves, process data accesses to main memory when cache misses occur, perform store operations into the cache interleaves, and cast out aged data (using a Least Recently Used method) from the cache into main memory in order to make room for incoming data from main memory accesses.

As stated above, the main memory banks are physically distributed between the two clusters of the BI-nodal system. However, the main memory appears as a single unified entity to any of the Processors or I/O Adapters located anywhere in the SMP system. Therefore, the present embodiment incorporates an additional set of controllers, known as Remote Fetch/Store Controllers. The System Controller keeps track of which main memory addresses are assigned to the memory banks on each cluster. Whenever data accesses (fetch requests) miss the cache on the local cluster, (where the term local refers to the cluster to which the originating Processor or I/O Adapter is attached), the Local Fetch/Store Controller must interrogate the remote (or "other") cluster to see if the data resides in that cache. These remote interrogations are processed by the Remote Fetch Controllers, which make requests into Central Priority and access resources in a similar fashion to the Local Fetch/Store Controllers.

In addition, if the data access misses the remote cache, but the address denotes that it belongs to a memory bank attached to the remote cluster, the Remote Fetch/Store Controller also interacts with the Main Memory Controller to initiate main memory accesses. For operations which necessitate storing data into memory (such as casting aged data out of the cache), the address once again determines whether the Local Fetch/Store Controller can process the entire operation or if a remote store operation must be initiated across the BI-nodal interface. In this situation, the remote store operations are processed by the Remote Store Controller who also interacts with the Main Memory Controller to store the data into the memory interleaves. As with the Local Fetch/Store Controllers, their remote counterparts also contain all the resources (including data paths, fifo buffers, and cross point switches) necessary to process inter-cluster operations.

The present invention also interacts with a remote management system for managing the resources comprising the aforementioned Remote Fetch/Store Controllers, and to distribute work to these Remote Fetch/Store Controllers, who in turn, act as agents to perform the desired operation without requiring knowledge of the requester who initiated the work request. Work is distributed only when a remote resource is available for processing the work, without a need for constant communication between multiple clusters of symmetric multiprocessors.

In a large system such as an IBM e-server Z-Series, shared access to the cluster cache is controlled by a centralized pipeline. All requests from processors (including I/O adapters) and remote fetch and store controllers (RFAR and RSAR) must initially arbitrate for priority to enter the central pipe and obtain directory information. Based on the directory state, additional pipe passes may be necessary. Once a requester enters the pipe, a series of interlocks ensures that the desired line can't be stolen out from under the requester. Historically, these interlocks are based on a partial line address corresponding to the address of the directory row (a.k.a. the congruence class), as opposed to a full line address. In cases where a requester must make multiple pipe passes, not only is the desired line locked until the operation completes, but so are all other lines in that congruence class. If another requester desires a different line in the same congruence class, it must wait on the first operation.

The present invention employs an asynchronous remote cast out method which enables inter nodal cast outs to completely bypass the central pipeline on the remote cluster and make an immediate request to store the data to main memory. This is possible because our invention benefits from two design advances in the System Controller. First, the System Controller (SC), incorporates a strong store ordering scheme in which a line can only exist in a changed state in one of the nodes at any time. Essentially, if a central processor (CP) wants to update a line, it must request exclusive ownership, which mandates that all other requesters must relinquish ownership. At this point, the CP can change the line and the resulting update only exists in the cluster "local" to the updating CP. Subsequently, if another requester on the remote cluster desires ownership of that line, the cache management scheme requires that the line be transferred from the local to the remote cache as part of the fetch operation. Thus, the final state shows the line invalidated in the local cluster, and valid and changed in the remote cluster. On the other hand, if a processor on the remote cluster desires read-only access, a copy of the line will be sent to the other cluster, but remains changed only on the local side. Finally, if the data exists read-only in multiple nodes, has the changed line status active on a remote node, and is requested exclusively by a CP on the local node, the cache coherency scheme of the preferred embodiment results in the remote copy of the data being invalidated and the changed line status being transferred to the local node.

The second aspect of the asynchronous cast out is that the SC utilizes the concept of a high speed remote interface controller which dispatches work to fetch (RFAR) and store (RSAR) controllers on the remote side on behalf of a sister controller on the local side (LFAR and LSAR). The LFAR and LSAR controllers are the "masters" of the line fetch and store operations, and in those cases where the data resides on the local side, they are the only controllers involved. But for those scenarios where the data must be acquired from, or stored to, the remote side, then the work is passed to a matching RFAR or RSAR on the other cluster. In the case of a cast out operation, LSAR, on the cluster where the requester resides, is the master controller. It has the responsibility to analyze the directory state and determine if the line needs to be cast out locally or remotely. Since the data can only be changed in one cache, a cast out operation will always begin with an LSAR attached to that cluster. Therefore, the only role of RSAR is to deliver data destined for the other cluster to main memory. RSAR decodes the work request dispatched to it by the high speed remote interface controller and if it's a cast out, the data is stored in a buffer while an immediate request is made to main memory. As previously stated, this operation bypasses the central pipeline which means the data isn't held up waiting for an interlock with another request for the same congruence class to clear.

Another aspect of the cache management scheme employed in the present invention is the ability to track line change status on a half line basis. In other words, if a line of data (256 bytes) must be aged out of the cache to make room for a newly requested line, but the changed bytes all exist in either the lower half or upper half, then LSAR will arrange for a transfer of only the 128 bytes that contain the changes. Although RSAR bypasses the pipe in either type of cast out, it does differentiate between the two types to reduce the required inter nodal and main memory bandwidth required.

Lastly, the present implementation of the asynchronous cast out mechanism permits more efficient management of the main memory banks by reducing the latency from the time the cast out operation begins on the local side to the time the request arrives at the remote main memory controller. For example, data can be cast out to idle memory banks while other types of storage ops (i.e. I/O Stores) expend time negotiating pipe arbitration and multiple pipe passes.

Our invention enables the same RSAR that handles asynchronous cast outs to operate in a traditional synchronous fashion (like LSAR, LFAR, RFAR, etc.) to handle other types of store operations which necessitate performing directory accesses, updates, and interlocks. The various operations range from storage padding, to main memory move page store ops, to the I/O Adapter storing into main memory. In the first two cases, the data is always sent to main memory. If the target address is the remote cluster, then LSAR immediately transmits the data across the clusters with the appropriate command. Unlike remote cast outs, the data may exist in the remote cache, so our invention must enter the central pipeline for purposes of analyzing the directory state. On a miss, an immediate request can be sent to the memory controller. If the data hits in a "read-only" state, RSAR will invalidate the directory entry and broadcast cross-invalidates (XIS) to the processors. If the data hits with "exclusive" ownership, RSAR must coordinate the completion of any pending CP Stores with the required invalidations of said CP stores before it can permit the memory store to complete. In cases where the storage padding or move page store op target the local cluster, the possibility still exists for the data to reside in the remote cache. In this situation, LSAR sends only an invalidation command but leaves the data in the local cluster. Once again, RSAR performs the necessary directory access and/or updates, but doesn't need to perform any transfer to main memory.

The most complex type of synchronous operation that the present invention incorporates is stores from the I/O Adapter into main memory. Unlike the storage pad and move page store ops, I/O stores will overwrite cache data in cases where data hits in either cluster. Furthermore, the operation is complicated by the fact that an I/O Adapter can issue a store at any time without first requesting exclusivity to the line. Thus, the data can exist in almost any directory state at the start of the operation. When an I/O store if first received by the SC, LSAR on the local side performs a preliminary directory analysis. In cases where the I/O store hits the local cache, the data will be stored into the local cache. Thus, RSAR doesn't need to participate in an data transfer. If the data hits read only in both caches, LFAR must send a read-only invalidation to the other cluster, and although the present invention could easily handle that request, for reasons of simplicity the SC encompassing the present embodiment uses the Remote Fetch Controller (RFAR) to perform these read-only invalidations.

I/O stores that miss the local cache, always involve the present invention, and the method for handling the store is governed by the target address. If the I/O store targets the remote side, LSAR will immediately dispatch the data with the command. RSAR will perform the same directory analysis and update actions as with the storage pad and move page store operations. In the event of a hit in the remote L2 cache, RSAR will transfer the I/O store data into the remote cache, instead of requiring the data to be cast out to main memory. For I/O stores that target the local side, LSAR sends over a special query command. This command serves two purposes:

1. It allows RSAR to interrogate the remote directory and determine if the data resides in the remote cache 2. In the case where the data hits, it serves as a means for holding RSAR valid while LSAR subsequently transfers the data.

In the aforementioned cases, RSAR uses an innovative technique of "locking" the resource during the query in anticipation of the need to subsequently transfer the data. If it turns out to be a case where no directory update needs to occur, or the directory only needs to be invalidated, RSAR will release itself once it returns the final response. However, if it is a case where the data needs to be transferred between clusters, RSAR will remain valid after the query response is returned. LSAR will ensure that the next command sent to that RSAR is the I/O Store data transfer. One advantage to this method is it only requires the use of a single LSAR/RSAR pair to handle all aspects of the I/O store. Another advantage is the prevention of deadlocks or changes in directory state which can result in leaving the line "unlocked" during the time between the query repines and the reception of the I/O Store data transfer. One final advantage of the present invention is the ability to handle 64 byte and 128 byte I/O Stores. Like the asynchronous cast outs, this enables better inter nodal bandwidth by only tying up the data busses for half the transfer time if the I/O adapter only needs to update 64 bytes of storage.

Our invention offers several improvements over the remote store controller implemented in the prior generation S/390 G5 and G6 Enterprise Servers. As previously stated, the present invention exploits the cache coherency scheme to permit asynchronous cast outs to main memory. Previous RSARs utilized the centralized pipeline for all data stores to main memory, which not only delayed the initiation of the store request, but also introduced the potential for the operation to be rejected out of the pipeline, thereby necessitating a recycling of the operation.

Lastly, the prior design point used a complex mechanism for handling I/O stores. In cases where the I/O store targets the local cluster and missed the local cache, a special "force cast out" command would be sent to the remote RSAR. This command required the RSAR to query the remote directory and if the data was resident, it would enlist an LSAR on the remote cluster to initiate an immediate cast out of the data. That LSAR would, in turn, send a remote cast out operation back to the local cluster, thereby necessitating an RSAR on the local side. In certain situations, the local RSAR could be busy, thus delaying the cast out and impeding the entire I/O store. In the worst case, the local RSAR could be busy processing a different operation which has an address compare against the I/O store, thus creating a deadlock. The prior systems contained a great deal of logic to detect these cases and break the deadlocks, which led to increased design complexity. It also had the drawback of requiring 4 resources (the local LSAR, remote RSAR, remote LSAR and local RSAR) in order to complete I/O stores scenarios requiring forced cast outs. The present invention offers greater design simplicity in addition to a more efficient approach to handling I/O stores.

Although the present invention is being described in association with the present preferred embodiment, one skilled in the art will appreciate that the concepts disclosed herein are applicable to systems comprising more than two clusters, and utilizing Storage Clusters differing from our present embodiment. Additionally, the present invention contemplates alternate System Controller embodiments with a different number and configuration of functional units, including, but not limited to, the cache structure, the main memory organization, the number and size of data path resources (such as buffers, control busses, etc.), the composition of the various controllers, and the number and size of the Pipelines.

These and other improvements are set forth in the following detailed description. For a better understanding of the invention with advantages and features, refer to the description and to the drawings.

BRIEF DESCRIPTION OF THE DRAWINGS:

FIG. 2A illustrates the block diagram of the present invention

FIG. 2B shows the operational sequence chart for the Remote Store Controller

FIG. 3B depicts the store operation abort mechanism

FIG. 4 illustrates the flowchart for processing Remote I/O Store operations

FIG. 7 illustrates the internal Fast Hang Quiesce logic with the Remote Fetch and Store Controllers.

Our detailed description explains the preferred embodiments of our invention, together with advantages and features, by way of example with reference to the drawings.

Figure 1:
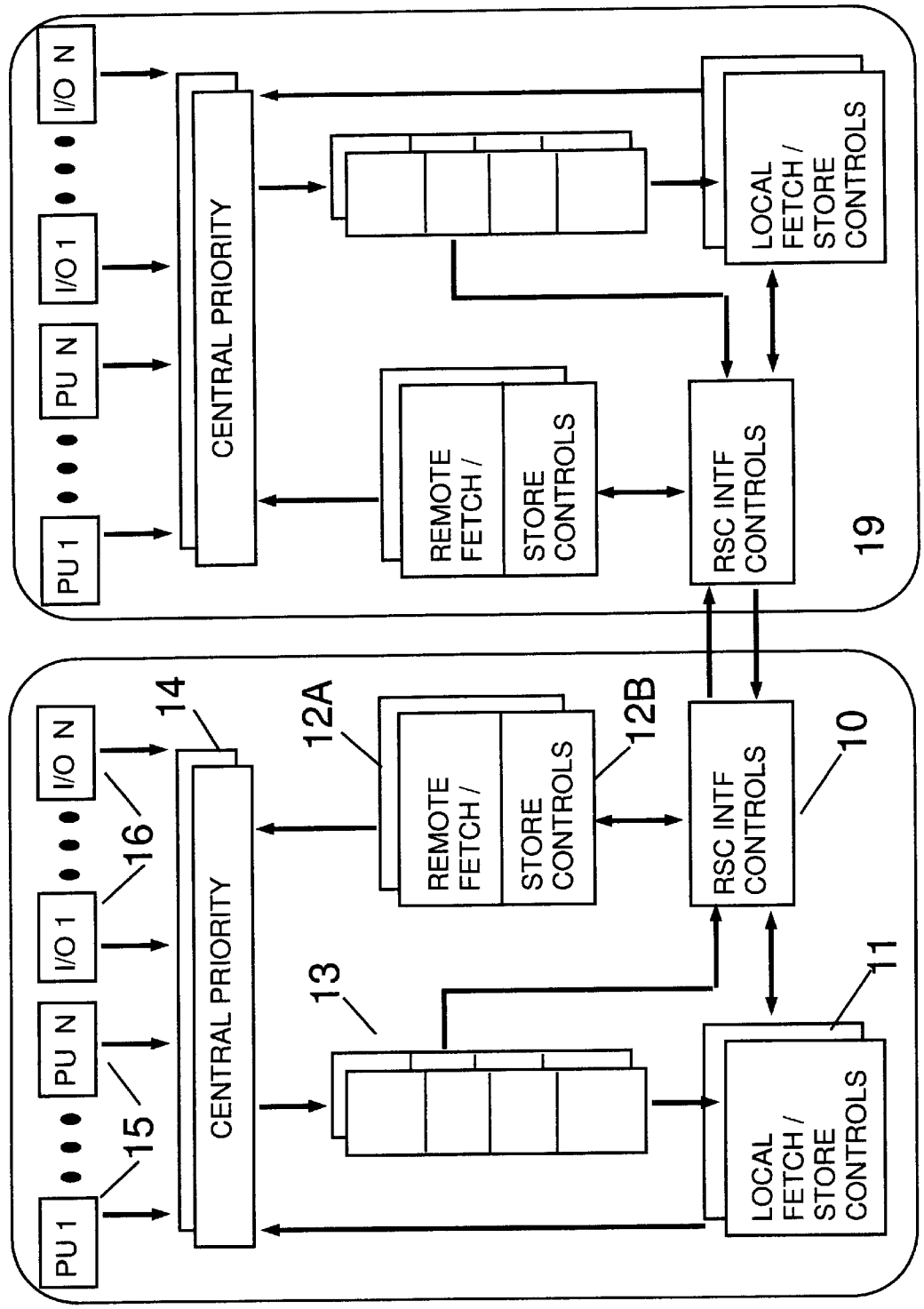
FIG. 1 depicts a BI-nodal System Controller in a symmetric multiprocessor system.

DETAILED DESCRIPTION OF THE INVENTION:

FIG. 1 depicts two clusters in a BI-nodal symmetric multiprocessor system, each of which contains a System Controller. The Remote Storage Cluster Interface Controller (RSC IC 10) interacts with a plurality of Local Fetch/Store Controllers (11), Remote Fetch Controller (12A), the Remote Store Controller (the present invention 12B), and Centralized Multistage Pipelines (13). These Pipelines are fed by a Central Priority (14) Station which prioritizes asynchronous work requests emanating from N Central Processing Unit Controllers (15) or N I/O Adapters Controllers (16). Each CPU Controller has an affinity to a particular Central Processor (CPU) in the SMP system. The Pipelines comprise a store-in shared cache to which all Central Processing Units, I/O adapters and Local and Remote Fetch/Store Controllers have read and write access. The cache coherency operation employed in the preferred embodiment permits data to reside in the cache in a read-only state which permits all processors and I/O adapters on both clusters to access copies of the data, or an exclusive ownership state whereby a single processor can own the data at any time. Any processor on any cluster may request ownership of data at any time, even if another processor currently owns that data.

Within the Local (11) and Remote (12A and 12B) Fetch/Store Controllers are dedicated controllers for managing fetch and store operations. The Local Fetch Controller works in conjunction with the Remote Fetch Controller (12A) to initiate and manage data fetches from anywhere in the system. Conversely, the Local Store Controller initiates store requests to any memory location in the system. In cases where the request targets the memory or cache on the local cluster, the Local Store Controller manages the entire operation. However, when the request targets a memory location on a remote cluster, the Local Store Controller initiates a request to the present invention (12B) which acts on behalf of the Local Store Controller to store the data in a most efficient manner.

The preferred embodiment utilizes a dual pipeline design in which the Central Pipelines (13), Remote Fetch/Store Controllers (12A and 12B) and Local Fetch/Store Controllers (11) are all duplicated. The concepts disclosed in the present invention are independent of the surrounding structure of the System Controller (SC) and can be just as effectively implemented in a more traditional single pipeline SC design or a less traditional SC design employing three or more pipelines. One skilled in the art will appreciate how the Remote Fetch/Store Controller interfaces and internal functional blocks can be easily scaled to adapt to almost any SC structure.

The Remote Storage Controller (12B) are comprised of several sub-units which interact with various SC functional units. Since there is only a single Remote Storage Cluster interface to service requests from twin sets of Pipelines (13) and Fetch/Store Controllers (11, 12), the solitary RSC IC has to accommodate a multitude of local interfaces as well as the cluster-to-cluster interface. In addition, it has to manage traffic flowing from the local cluster to the remote cluster as well as traffic flowing from the remote cluster.

Turning our attention to FIG. 2A, we see the functional blocks which comprise the Remote Storage Controller (12B). The Storage Controller receives a command from the Remote Storage Cluster (RSC) interface and processes it in the Command Decoder (20). Unlike typical memory controllers which handle a small number of simple data transfers to and from main memory, our invention is capable of managing a plurality of storage operations resulting from processor and I/O processes. The command set associated with the preferred embodiment is LRU Cast Outs to store "aged" modified cache data into main memory Store Physical Absolute to store data sent from a central processor directly into a main memory location, bypassing the cache hierarchy Store Pad to replicate a data pattern dictated by a central processor into a main memory location.

Move Page Store to relocate a page of storage from a source main memory address to a target main memory address I/O Store to store 128 or 256 bytes of I/O data into a main memory location or directly into the shared L2 cache is the data is already resident in the cache.

Most operations in the present invention require synchronization through the Centralized Pipeline (13) since they may involve a line of data concurrently being operated on by another processor or I/O device. Our invention uses a Synchronous State Machine (21) to control each operational sequence. In the preferred embodiment, the states of said machine are referred to as modes. Each state or mode transition requires the Remote Storage Controller to make a request to the Centralized Pipeline (13).

Figure 3A:
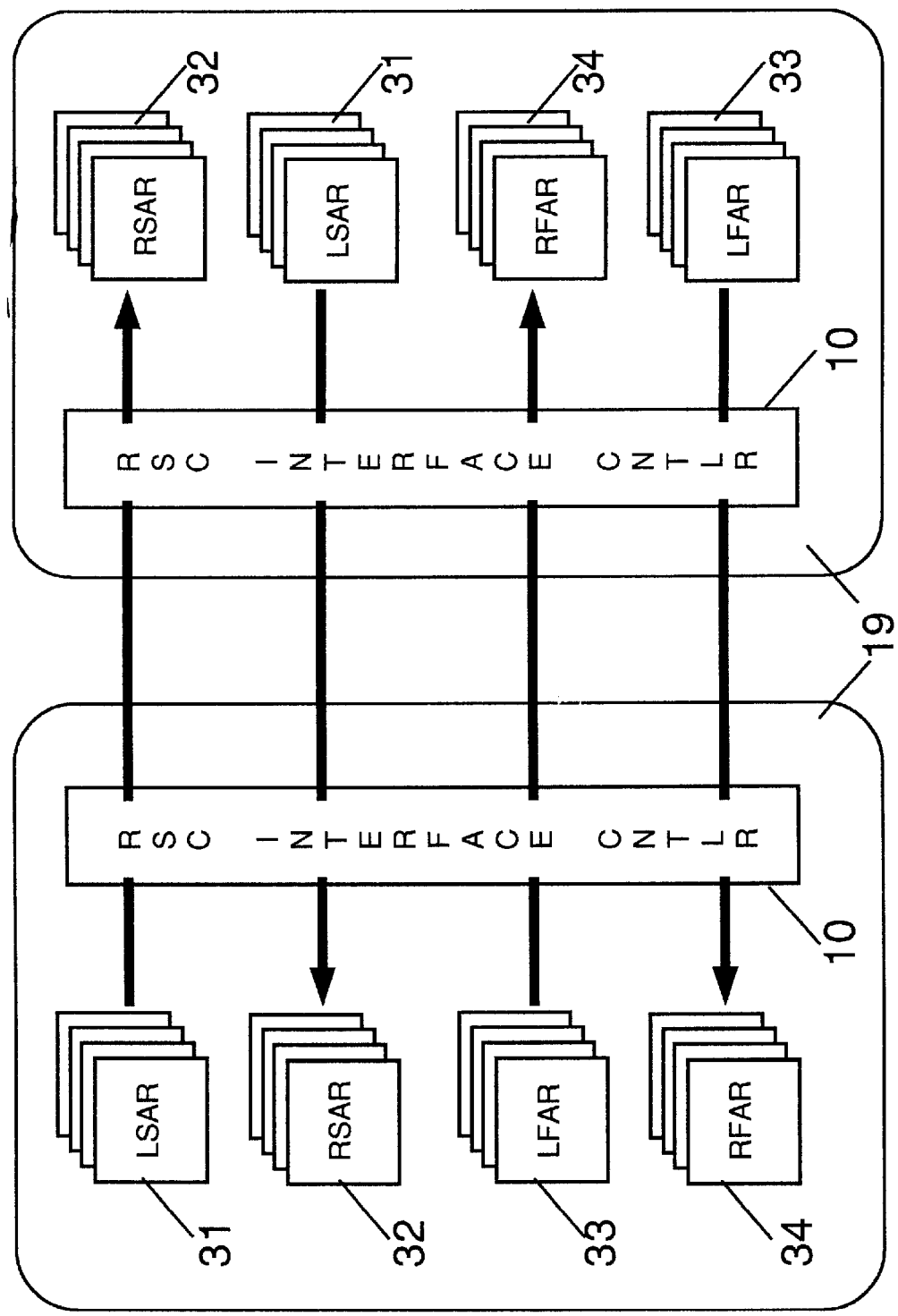
FIG. 3A show the affinity between the local and remote controllers

FIG. 3A depicts the multitude of controllers with their prescribed affinity. Every remote operation is initiated by a local Fetch or Store Controller. In the preferred embodiment, these controllers are arranged in groups of four per centralized pipe (13). The group of four Local Store Controllers (LSAR 31) initiate all remote store operations by transmitting the store command through the RSC Interface Controller (10). On the remote cluster there exists a matching set of four Remote Store Controllers (RSAR 32) who service the store operations on behalf of the local controller. The present invention utilizes a dedicated 1-to-1 affinity between the local LSAR and remote RSAR controllers to assist in preventing cross-cluster deadlocks as well as improving overall system throughput by permitting four concurrent operations per pipeline to be in progress on either cluster (19). Although the present invention doesn't describe the Fetch Controllers in detail, FIG. 3A also depicts the same relationship between the group of four Local Fetch Controllers (33) and their affinity to the four Remote Fetch Controllers (34) on the other cluster. The important aspect of the preferred embodiment is that the present system structure permits a total of 8 Fetch and Store operations to be in progress in a cluster at any time. The present invention represents a single instantiation of the four RSAR controllers and thereby must contend with the other seven requesters to vie for priority into the Central Pipeline (13).

In the preferred embodiment, a Pipe Pre-Priority Station (22) exists to arbitrate among the aforementioned 8 Fetch/Store controllers (along with a ninth controller dedicated to processing firmware operations and whose description is omitted from this disclosure for brevity). This station employs a ranked priority scheme to always give the Millicode request priority over the Remote Fetch requests, and the Remote Fetch requests priority over the Remote Store requests. An LRU scheme is used to arbitrate among the 4 possible Remote Storage requests. The selected request is then forwarded to the Central Priority Station (14) where it's arbitrated among all the other requesters in the System Controller. Even though the preferred embodiment employs a combination of ranked priority and LRU using groups of 4 requesters, one skilled in the art can appreciate how a plurality of arbitration techniques and any combination of Remote Fetch, Store and Millicode controllers can be applied to the present invention.

Once a request enters the Central Pipeline (13), it may encounter a address compare. This occurs when the cache line address of the current operation matches the cache line address of another operation being processed in the System Controller. This other operation can be processed by one of the three other Remote Storage Controllers or any of the Local Fetch/Store Controllers (11), Processor Controllers (15), I/O Controllers (16) or Remote Fetch Controllers (12A) attached to the current pipeline. In addition, since the preferred embodiment employs a multistage pipeline, in certain cases the current operation must also be compared with the operations that entered the pipe on the previous one and two cycles. Many examples of prior art utilize address compare techniques to synchronize operations and in the simplest implementation any compare requires the operation to be rejected back to the originating requester and then retried at a later time. Although this is the safest approach, it is also usually the slowest since some operations can be lengthy thus requiring the controller to wait a substantial amount of time before being allowed to proceed. Our invention improves system throughput by classifying each type of address compare as:

those which can be recycled back into the Centralized Pipeline once the compare clears
those which can be safely ignored
those in which the associated operation can be aborted
those in which the operation is rejected to the originating cluster By classifying each type of address compare in this manner, the present invention not only permits certain operations to continue processing, or at least waiting a reduced amount of time, but it, plays a key role in the methods for cross-cluster deadlock avoidance.

The present invention provides several rules governing address compares and what actions should be taken. If the current operation compares against any CP fetch or I/O operation which entered the pipeline 1, 2 or 3 cycles ahead of the current RSAR operation, then the Remote Store Controller must wait for the compare to clear and recycle its request. This is also true for Store Pads, Move Page or Cache Purge operations 1 cycle ahead of the current RSAR operation. Once an operation is loaded into an LFAR, the present invention will honor any address compare and wait for it to clear unless one of two conditions is true:

1. LFAR is processing a read-only invalidate command which simply invalidates the current copy of the data in the cache. In this case, our invention can ignore the compare because all store operations except for I/O Stores will either invalidate the directory or store directly to main memory bypassing cache coherency. I/O Stores that hit the cache will process in their normal fashion and complete with a final directory state of valid. The preferred embodiment uses an interlocking mechanism between LFAR and RSAR which guarantees the read-only invalidate will happen before the I/O Store completes.

2. LFAR is processing a data fetch but the data has not yet been returned. In this case, the interlocking mechanism between LFAR and RSAR guarantees that LFAR can't change the cache state until after the RSAR operation completes.

For operations that compare against operations being processed by a Local Store Controller (LSAR), the LSAR Compare Chart (35) in FIG. 3B is used to determine the resultant action. Regardless of what operation LSAR is processing, if RSAR is processing an LRU Cast Out or Store Physical Absolute, then the Remote Storage Controller can safely ignore the compare since these operations bypass cache coherency. Additionally, if LSAR is processing an I/O Store, the architecture in the preferred embodiment permits RSAR to safely ignore the compare because an I/O Store can be processed in any order relative to other memory store operations. If LSAR is processing an LRU, the Remote Store Controller must always wait for the compare to clear.

In cases where LSAR is processing a Store Pad or Move Page Store, and RSAR is processing any cache coherent operation, the present invention employs a novel feature called an operational abort. In these situations, the Remote Store Controller simply aborts the current store operation. This is permissible since the final cache state for Move Page Store and Store Pads is always an invalid state with the data being sent to main memory. Therefore, the abort gives the appearance that the RSAR performed its operation, only to have the LSAR operation succeed it and invalidate the cache entry and overlay the data in main memory. Thus our invention doesn't bother to tie up the main memory data path or take the time to transfer the data, and instead lets LSAR always win and complete it's operation. This also frees up the Remote Store Controller sooner so it can accept a new command. Although the aforementioned address compare techniques are presented with a focus on system performance, it should be noted that the 1-to-1 affinity depicted in FIG. 3A along with the address compare actions in FIG. 3B also assist in preventing potential cross-cluster deadlocks. This is explained in more detail in co-pending application Ser. No. 09/745,830.

Returning to FIG. 2A, the Synchronous State Machine (21) employs sequences such as those shown in FIG. 2B.

The Sequence Chart (28) shown in FIG. 2B illustrates the mode transitions that the present invention makes for various store operations depending on the cache state. Unlike many store controllers in the prior art which simply communicate with the memory elements to transfer data to and from main memory, our invention must also perform various other functions to maintain proper cache management throughout the system structure. For example, as previously stated, LRU Cast Outs and SPA operations never require cache management, so they only require an initial mode (or state) of 0.

Additionally, operations such as I/O Stores, Move Page Stores and Store Pads that miss in both the local and remote cache, also don't require any subsequent pipeline passes after the initial Mode 0 pass which performs the directory lookup to determine the state. However, these same I/O Store, Move Page and Store Pad operations do require additional mode transitions if the data is resident in the remote cache. Move Page Store and Store Pads which hit in the remote cache in a read-only state or exclusive to the I/O, need to invalidate that copy of the data so the preferred embodiment performs a Mode A pass to update the directory state. If these operations encounter the data in an exclusive state to a CP on the remote cluster, then the present invention must perform a Cross Interrogate (XI) to request the processor to relinquish ownership of the data. This involves an additional Mode 2 pass to permit the processor to finish processing any pending stores to any bytes belonging to the current line. These stores are sent to the System Controllers CP Store Stack where the present invention monitors the stores and waits for them to complete before proceeding with the invalidation.

I/O Stores perform similar mode transitions to the Move Page Store and Store Pad operations. The major difference is in the preferred embodiment, any I/O Store targeting a memory address on a remote cluster results in the I/O data automatically being transferred to the remote cluster along with the command. Therefore, the Remote Storage Controller will perform a store operation, the only determination to be made is whether to store the data into the shared cache or send it directly to main memory. The Sequence Chart (28) indicates that I/O Store operations which hit in the remote cache either in a read-only or exclusive state will complete with a Mode E pass which performs a data write to the shared cache. Unlike Move Page and Store Pad operations whose final cache state is always invalid, an I/O Store terminates with data being stored in the cache in a valid state. Once again, this exemplifies another aspect of the present invention which permits data to remain in the higher performance shared caches, as opposed to always requiring data to be written back to slower main memory, thereby improving overall system performance.

Another aspect of the present invention involves a new method for performing I/O Store operations which minimizes the number of local and remote resources required to perform the operation. In the architecture pertaining to the preferred embodiment, an I/O device can perform a store operation asynchronously to any storage address in the system, even if that address is currently owned by a processor. The cache management protocol ensures that any owning processor relinquishes its ownership and stores any modifications prior to processing the I/O store. However, the final location of the I/O Store data is not dictated by the architecture or the cache management protocol. The following method is used to illustrate how an I/O Store initiated from an I/O adapter on the "local" node is processed.

i. I/O Store targets the memory attached to the "remote" cluster and misses the local cache. In this situation, LSAR unconditionally transmits the data to the RSAR on the remote cluster and the Remote Storage Controller follows the appropriate sequence in FIG. 3B depending on the remote cache state. The data is either stored into the remote cache or the remote main memory.

ii. I/O Store targets the memory attached to any cluster and hits the local cache. In this case, the store is performed into the local cache, thus eliminating the need to busy the cross-cluster data bus. If the data hits exclusive then, by definition, this can be the only copy of the data. However, if the data hits read-only, with another read-only copy in the remote cache, then LFAR sends a read-only invalidate command to the RFAR on the remote cluster, thus invalidating the remote copy.

iii. I/O Store targets the memory attached to the "local" cluster and misses the local cache. Our invention improves upon previous designs of large SMP systems where a special force cast out command would be sent across the interface to interrogate the remote cache, and if present, LSAR would initiate a cast out operation to return the data to the local cluster. This involved the use of four resources; the local LSAR initiating the force cast out interrogation, the remote RSAR processing the force cast out, the remote LSAR performing the cast out, and the local RSAR receiving the cast out. FIG. 4 illustrates the method used by the present invention. First, the local LSAR sends a I/O Query Command (40) to the Remote Storage Controller. RSAR accesses the directory to determine whether the data resides in the remote cache (41). The Response Logic (25) is used to send an interrogate response indicating hit or miss (42). If the directory result indicates a miss (43), then the Remote Storage Controller resets itself (44) and the I/O Store is performed to the local memory. However, if the directory results indicate a hit (43), then our invention retains the RSAR resource (46), and the local LSAR follows up with an I/O Store command (47). The Remote Store Controller then processes this as if it were case (i) and store the data into the remote cache. This method ensures data is only transferred once using a single LSAR/RSAR pair just like all other remote store operations.

Returning to FIG. 2, those store operations that miss in the remote cache, or mandate that the data is written out to main memory (such as Move Page Store or Store Pad), the Synchronous State Machine (21) interfaces with the Memory Arbitration Unit (24) to initiate a data transfer request to main memory. Upon completion of the store operation into main memory or into the shared L2 cache, the present invention employs the Response Logic (25) to generate a final response and request the RSC Interface Controller (10) to return it back to the Local Store Controller (11) on the originating cluster. Since the preferred embodiment contains four Remote Store Controllers, the potential exists for more than one controller to attempt to return a response simultaneously. Therefore, our invention employs a round-robin technique to select one of the responses to forward to the RSC Interface Controller (10).

Our invention further seeks to maximize system throughput by differentiating between those commands which require cache coherency and those that don't. In the preferred embodiment, certain operations such as LRU Cast Outs and Store Physical Absolute (SPA) don't require cache management. In the case of LRU Cast Outs, data is only stored to main memory if it has been modified by a processor that has previously acquired the data with exclusive ownership. Another example of an operation which doesn't require cache management is a Store Physical Absolute (SPA). This is a storage command issued by the processor for the sole purpose of directly updating a piece of data in main memory without the need to first access it in an exclusive state. Such an operation is used primarily to test memory during initial booting of a computer system. Thus, our invention capitalizes on this and immediately forwards these command to the Memory Arbitration Unit (24). The Memory Arbitration Unit is responsible for selecting one of the four possible remote main store requests that the preferred embodiment could generate.

By incorporating the Command Decoder (20), Synchronous State Machine (21) and Memory Arbitration Unit (24), our invention is capable of handling any combination of synchronous and asynchronous operations among the four Remote Store Controllers. One skilled in the art could appreciate how the present invention is also applicable to operations other than those described in the preferred embodiment and is in no way limited to four controllers. For instance, the apparatus disclosed herein could be implemented using a large number of Remote Store Controllers to permit a great degree of concurrent processing as long as sufficient data paths and resources could be implemented to support the resulting system traffic.

Figure 5A:
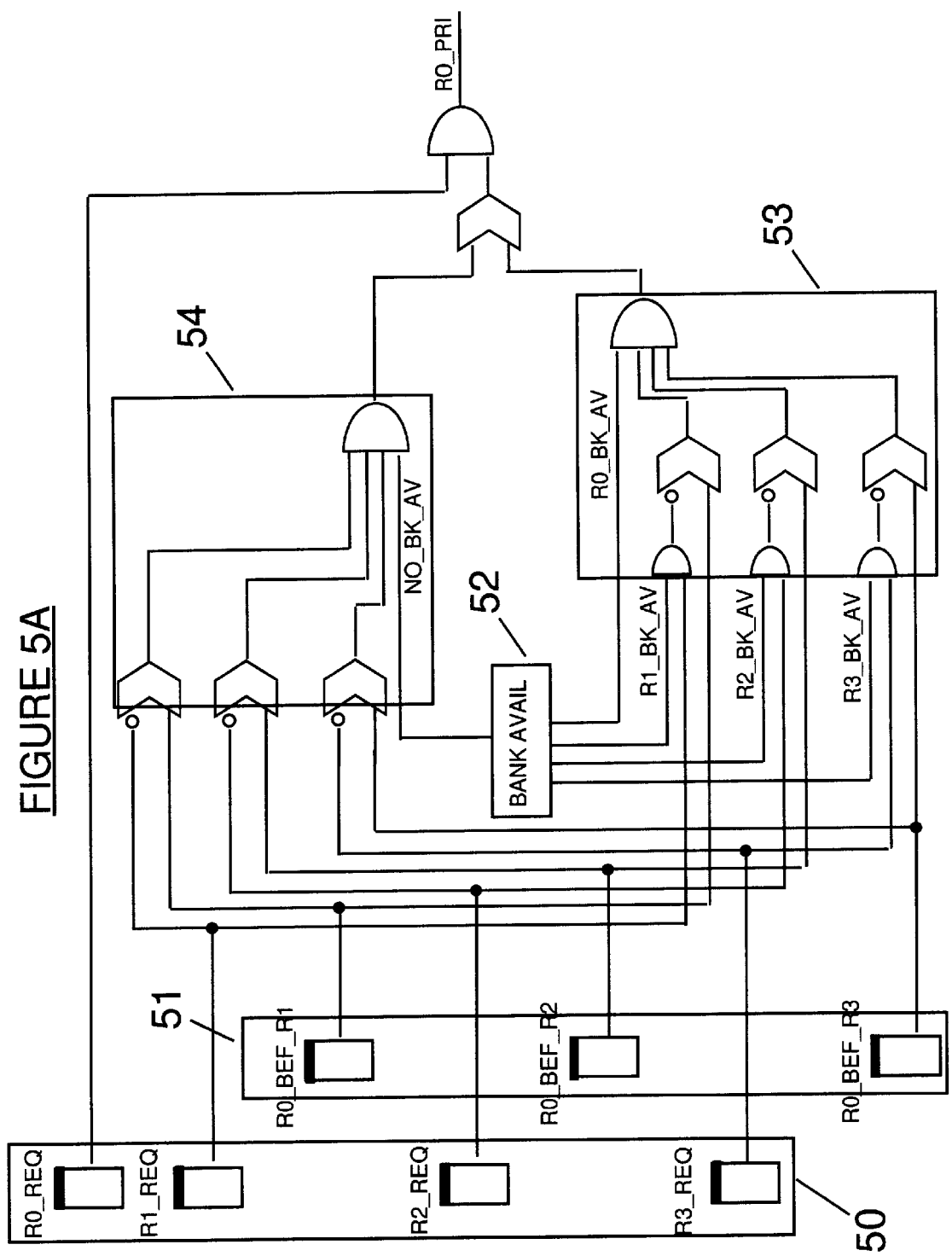
FIGS. 5A and 5B depict the logic comprising the Memory Arbitration Unit

Since the disparity between improvements in processor performance relative to memory performance continues to increase, system designers must pay more attention to the cost in performance of issuing a memory operation. This importance is accentuated in situations where memory operations are initiated, but fail to complete for some reason such as a memory bank or memory data path being unavailable. Our invention improves remote storage efficiency by employing the intelligent Memory Arbitration unit depicted in FIGS. 5A and 5B. The four possible RSAR memory requests are arbitrated using a modified LRU scheme. The preferred embodiment sets a memory request latch for each Remote Store Controller. These 4 memory request latches (50) are shown in FIG. 5A and labeled R0_REQ thru R3_REQ. These request latches drive the arbitration logic which is comprised of several main components, one of which is the LRU latches (51).

Although FIG. 5A only shows the three LRU latches associated with RSAR 0, the preferred embodiment utilizes a total of six LRU latches to denote all possible combinations of the four RSAR requesters. The purpose of each latch is to dictate the priority of one requester in relation to the other three at any point in time. The three latches in the figure relate specifically to RSAR 0. If R0_BEF_R1 is on, then RSAR 0 should be chosen over RSAR1. If it's a zero, then RSAR 1 should be chosen over RSAR 0. Thus, if R0_BEF_R1, R0_BEF_R2, and R0_BEF_R3 are all on, then RSAR 0 should be chosen over all the other requesters and thus wins arbitration. Since this is an LRU scheme, once a requester is chosen and a grant is received from the memory interface, then the 3 LRU latches pertaining to that requester are reset or set to indicate that the other 3 requesters should be chosen over it. The resulting behavior is for a requester to go to the bottom of the list once it's successfully granted, and then it must work its way back to the top.

One aspect of the present invention is the use of memory bank available logic (52) to only choose a request if the memory bank being targeted by that request is free. Therefore, if the LRU latches (51) indicate that RSAR 0 should be chosen first, but the bank it needs is unavailable, then if another RSAR has a pending request and its bank is available, it will be selected. FIG. 5A depicts two logical units dedicated to selecting a request based on bank availability. The Requester Bank Available logic (53) is invoked if the requesters target bank is available. Our invention is designed to always choose a requester whose bank is available, and if multiple requesters have their target banks available, the LRU latches (51) determine who is chosen. Since FIG. 5A focuses specifically on the logic pertaining to the RSAR 0 requester, the Requester Bank Available logic requires RSAR 0's bank to be available. In addition, either the LRU latches must have RSAR 0 favored over all 3 other requesters or for any requester who is favored over RSAR0, that requester can't be active with its bank available. To further improve system efficiency, our invention contains Speculative Store logic (54) which activates if no memory banks are available. In this case, the LRU latches (51) determine which requester is selected. The purpose of this logic is to reduce store latency by initiating a data transfer in hopes that the required memory bank will free up shortly after the data arrives in the memory card.

Figure 5B:
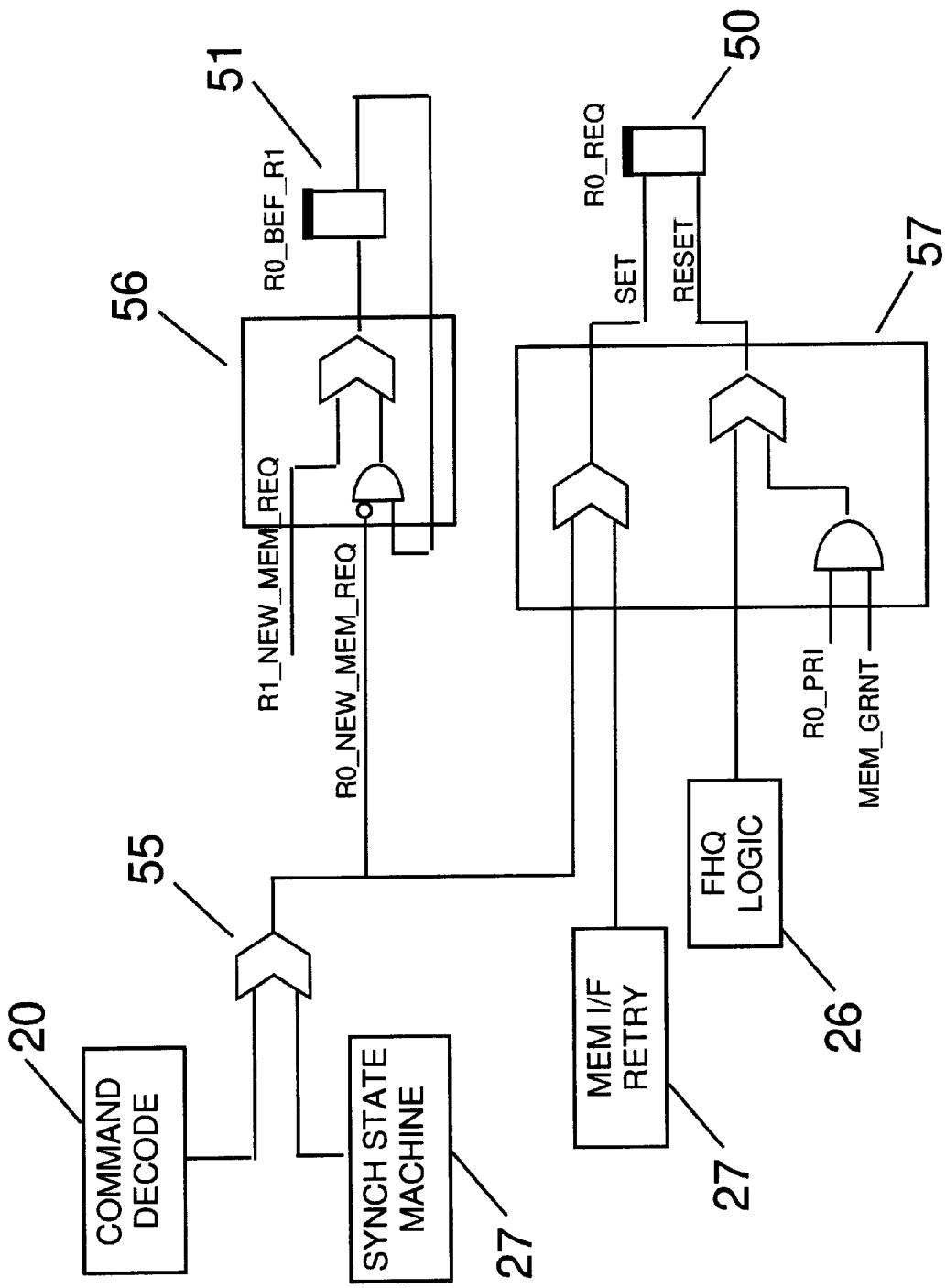

FIG. 5B shows the logic which comprises the memory request latch (50) and the LRU latch (51). Once again, the drawing depicts the logic solely for RSAR 0, but the logic is replicated for each additional RSAR requester. The request latch (50) is normally set via an "OR" (55) of the Command Decoder (20) or the Synchronous State Machine (27) as described earlier. In the case of non-cache coherent operations (LRU cast outs, store physical absolute, etc.) the Command Decoder sets the request latch. In the case of synchronous operations, the state machine sets the request latch during the appropriate mode transition.

Another feature of the present invention is the Memory Interface Retry Mechanism (27) shown in FIG. 2A communicating with the Memory Arbitration Unit (24). Its role involves monitoring memory interface errors and using them as potential third condition which can set a memory request latch in the Memory Arbitration Unit (24). If the memory interface detects a recoverable error (such as a command parity error), it signals the Remote Store Controller which proceeds with setting the request latch and attempting to retransmit the store. This provides further robustness to the system by allowing transient errors such as noise interference to be resolved automatically without the need to interrupt the processor or operating system. In cases where the error is recurring on a successive store attempt, our invention also detects it and treats it as a permanent hardware failure, thereby preventing a looping or hang condition from occurring. The request latch (50) is reset as soon as a grant is received from the memory interface priority station indicating that the store operation has been forwarded to the memory subsystem.

FIG. 5B also shows the LRU Latch Control Logic (56) for the RSAR 0 R0_BEF_R1 latch (51). As previously described, there are a total of six of these LRU latches which denote the priority by which each RSAR requester should be selected relative to the other three requesters. Although the diagram only depicts one of the six latches, the LRU Latch Control Logic is replicated in a similar fashion for the remaining latches. Since this latch denotes the relationship of RSAR 0 to RSAR 1, the only signals feeding it are the RSAR 0 and RSAR 1 new memory request signals. The output of the "OR" (55) is defined as a new memory request. The R0_BEF_R1 latch is set anytime RSAR 1 makes a new memory request. By setting the latch it ensures RSAR 0 will be favored over RSAR 1 on subsequent cycles. If RSAR 1 is the only outstanding request, it will be selected, even though the LRU denotes favoring RSAR 0. If RSAR 0 issues a new memory request some number of cycles after the RSAR 1 request, then the LRU Latch Control Logic (56) will reset the latch to indicate RSAR 1 should now be favored. This scheme ensures the oldest request will be favored over the newer request. Since the present invention handles both asynchronous and synchronous operations, it is possible for RSAR 0 and RSAR 1 to present new memory requests at the same time. In this situation, the preferred embodiment defers to favoring RSAR 0 over RSAR 1.

In addition to providing several means for improving performance and maximizing system throughput, our invention also affords a high degree of reliability and availability. In a large SMP system with limited resources, it's often possible for several controllers to deadlock against each other because one is holding a resource that the other needs to complete it's operation. This situation can be aggravated if new operations can continually enter the pipeline and possibly tie up further resources. Therefore, the present invention contains Fast Hang Quiesce (26) logic which serves two purposes. First and foremost it works in an active capacity to detect if the current operation is hung and not making forward progress. In this case it broadcasts a signal which suppresses any new operations from entering the Centralized Pipeline (13). The other aspect of the Fast Hang Quiesce logic is to act in a passive mode and monitor the other controllers to see if they are hung. If so, the Remote Store Controller, under certain conditions, will reject its current operation.

Figure 6:
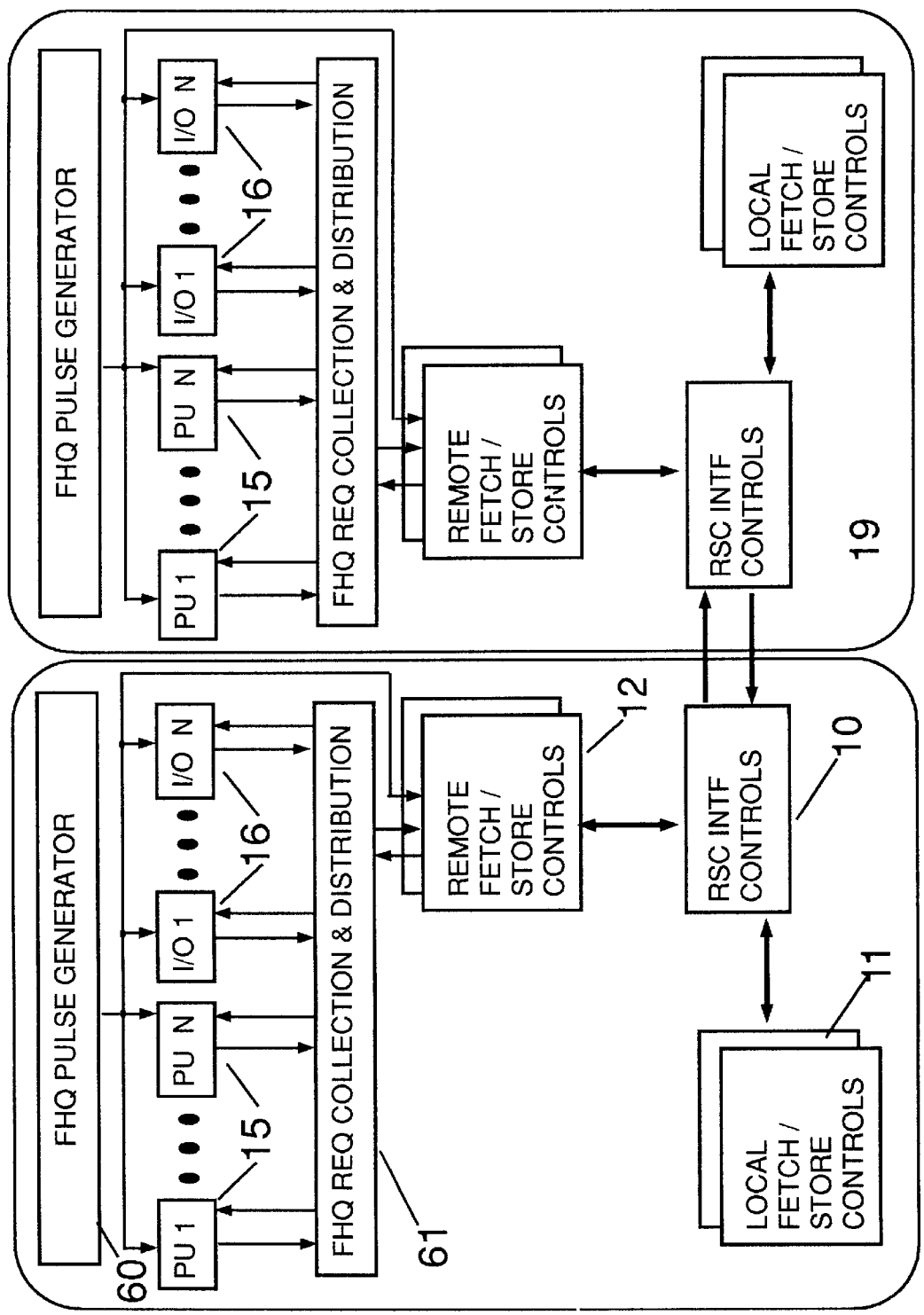
FIG. 6 illustrates the Fast Hang Quiesce mechanism

FIG. 6 illustrates the fast hang quiesce (fhq) pulse generation and distribution scheme within a binodal symmetrical MP system. A fhq pulse generator (60) sends periodic pulses to each of the PU controllers (15), IO controllers (16), and Remote Fetch and Remote Store controllers (12). If the number of fhq pulses received by a controller reaches a predetermined count known as the internal hang limit, that controller will generate its own internal hang pulse and sends it to the fhq collection and distribution logic (61) which in turn broadcasts this pulse to all other controllers. Receipt of a fhq pulse by a PU or IO controller results in all subsequent requests to that controller being forced inactive until all currently active operations are completed. Receipt of the fhq condition by a Remote Fetch or Remote Store controller results in a reject response being generated by said controller if the fhq pulse is received while processing a valid remote operation.

FIG. 7 illustrates the response generation scheme that is used to activate the response request latch (77) and encoded response request register (78) within a Remote Fetch or Remote Store controller. The response request generation logic (71) is driven by the Remote Fetch or Remote Store internal state machine (70). The response request generation logic also receives internal fhq pulses generated by the Remote Fetch or Remote Store controller itself along with external fhq pulses that are sent to the Remote Fetch or Remote Store controller via the fhq collection and distribution logic shown in FIG. 6. The response request generation logic includes logic to block activation of reject responses due to an internal or external fhq pulse if the state of the internal state machine is such that activation of a reject response could lead to a loop or deadlock condition. These blocking conditions are:

1. The RFAR or RSAR is already in the process of generating a response.

2. The RFAR or RSAR is in one of the following states:
   a. The internal state machine is not in the initial state
   b. The internal state machine is in the initial state, it hasn't encountered any compare and it's not currently waiting for any resources.

3. A reject response for this RFAR or RSAR has already been issued during this quiesce period.

In the first two cases, the current operation has progressed beyond the point where it is safe to terminate it, and the preferred embodiment advocates permitting the operation to complete on its own accord in order to free up resources potentially required to break any pending deadlock. In the third case, the restriction exists to prevent the present invention from entering into a synchronous loop whereby the same operation is retried indefinitely with each attempt triggering a reject response, which in turn results in another retry attempt.

The response generation logic is also controlled by four programmable disable switches (72, 73, 74, 75) which provide additional flexibility since these switches alter the behavior of the Remote Fetch and Store Controllers during Fast Hang Quiesce activity. Our invention contemplates the use of scan-only latches which can be set or reset through firmware thus permitting unknown deadlock scenarios in the field to be resolved.

1. Reject current op: Results in reject response for current RFAR or RSAR op assuming none of the blocking conditions described above are active.

2. Reject next fetch: Results in reject response for next RFAR op (instead of current RFAR op) assuming none of the blocking conditions described above are active.

3. Disable reject due to self: Blocks forcing of reject response if this RFAR or RSAR initiates fhq request.

4. Disable reject due to others: Blocks forcing of reject response if a requester other than this RFAR or RSAR initiated the fhq request.

Any combination of settings of these four disable switches is allowed with the restriction that the "reject current op" disable switch (74) and the "reject next op" disable switch (75) must not both be active at the same time.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A high speed remote storage controller system for a computer system having cluster nodes of symmetric multiprocessors, comprising one or more remote storage controllers each having an associated local interface controller, and a local-to-remote data bus, and the one or more remote storage controllers responsive to a remote management system for managing the resources comprising the remote storage controller for data accesses between clusters of symmetric multiprocessors which are controlled for inter nodal storage operations by one of said remote storage controller system, each of which clusters has a plurality of processors, a shared cache memory, a plurality of I/O adapters and a main memory accessible from the cluster, said remote store controller while processing data accesses across a plurality of clusters for data storage operations involving shared memory and inter nodal storage operations, enlisting a single one of said remote storage controller to perform remote cast outs, store requests from an I/O adapter, main storage padding operations, and main memory move page operations and while performing remote data storage operations to main memory, said enlisted single remote storage controller also handles cross cluster invalidations associated with maintaining inter-nodal cache coherency for said computer system having cluster nodes of symmetric multiprocessors, and which contains a deadlock avoidance mechanism designed to detect inter-nodal deadlocks which normally result from one resource on a local cluster waiting for a second resource on a remote cluster which is deadlocked against a third resource on said remote cluster waiting for a fourth resource on the local cluster which is deadlocked against said first resource on the local cluster, and which employs a fast hang quiesce mechanism embedded in each remote storage resource which works in conjunction with similar fast hang quiesce mechanisms throughout the System Controller to prevent system-wide hangs either caused by the failure of the current remote storage resource to make forward progress or by the failure of another operation somewhere in the Storage Controller to make forward progress.

2. The remote storage controller system according to claim 1 which enables communication with the other elements of the Storage Controller to signal the need for other concurrent operations in the Storage Controller to quiesce in order to permit the current remote storage resource to make forward progress in situations where lack of forward progress is detected.

3. The remote storage controller system according to claim 1 which enables the remote storage resource to react to the request from other controllers within the System Controller and reject the current remote storage operation in order that other operations in the System Controller may make forward progress in situations where lack of forward progress is detected.

4. The remote storage controller system according to claim 1 which upon detecting said inter-nodal deadlocks employs a systemic method to alleviate the deadlock and avoid a hang condition which would otherwise ensue if said deadlock was not successfully broken.

* * * * *